(12) United States Patent
Lambert et al.

(10) Patent No.: US 6,363,478 B1
(45) Date of Patent: Mar. 26, 2002

(54) SECURITY MECHANISMS IN A WEB SERVER

(75) Inventors: Howard Shelton Lambert, Southampton; Steven Wright, Upham, both of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/154,645

(22) Filed: Sep. 17, 1998

(30) Foreign Application Priority Data

May 16, 1998 (GB) ............................... 9810508

(51) Int. Cl.$^7$ ............................... H04L 9/10
(52) U.S. Cl. ............... 713/151; 713/153; 713/155; 380/262
(58) Field of Search ............... 713/151, 153, 713/155; 380/262, 269; 705/56, 64; 709/203, 206, 227, 228, 230, 246, 247

(56) References Cited

U.S. PATENT DOCUMENTS

| | | | | |
|---|---|---|---|---|
| 5,557,749 A | * | 9/1996 | Norris | 395/200.18 |
| 5,657,390 A | * | 8/1997 | Elgamal et al. | 380/49 |
| 5,852,666 A | * | 12/1998 | Miller et al. | 380/4 |
| 5,960,086 A | * | 9/1999 | Atalla | 380/44 |

FOREIGN PATENT DOCUMENTS

EP 0 810 524 3/1997 ............. G06F/9/46

OTHER PUBLICATIONS

Ian Johnson, "Tandem Targets High–End Market for New Web Server," Computing Canada, vol. 21, No. 11, May 24, 1995, p. 34.*

Derwent WPI Accession No. 98–259163/199823 & RD 408149 (IBM) Apr. 10, 1998, Abstract.

Dr Dobbs Journal vol. 22, No. 10, Oct. 1997, C Berg "How do I write java servlet?", pp. 121–123.

Netscape World, May 5, 1997, J Lowe "How Java servlets can replace CGI scripts—for ease, performance & more", from http://www.netscapeworld.com/netscapeworld/nw–05–1997/nw–05–bytecode.html website.

Netscape World, Jul. 4, 1996, T Gorman "Server–side applets in Java generate developer anticipation", from http://www.netscapeworld.com/netscapeworld/nw–07–1996/nw–07–jeeves.html website.

* cited by examiner

*Primary Examiner*—Tod Swann
*Assistant Examiner*—Justin T. Darrow
(74) *Attorney, Agent, or Firm*—A. Bruce Clay

(57) ABSTRACT

A session processing module for a server is adapted to communicate across the Internet with a plurality of clients. The processing module runs within a servlet and allocates a session identifier in response to a first input stream of a session between a client and the server; negotiates communication characteristics for the session; and instantiates, according to the communication characteristics, routines for processing subsequent session input streams containing request data and routines for generating session output streams containing response data. A variable depth of penetration to be applied to a dynamically specified quality of service for a session is enabled. Thus, in one embodiment the module relays encrypted request data for a session to a back-end server, and receives from the back-end server encrypted response data for the session for the client. Alternatively, the module itself decrypts input streams containing request data and processes the data to generate output streams containing encrypted response data for the client.

12 Claims, 2 Drawing Sheets

SECURITY MECHANISMS IN A WEB SERVER

FIELD OF THE INVENTION

The present invention relates to a session processing module for a server in a data communications network.

BACKGROUND OF THE INFORMATION

The characteristics of communication between a client and a server communicating across a network can be divided into several categories including: level of authentication of parties, if any, level of data compression, if any, and level of data encryption, if any. The nature of these characteristics can be termed a quality of service between client and server.

Secure Sockets Layer (SSL) is a security protocol designed and specified by Netscape™ for providing data security layered between application protocols (such as HTTP, Telnet, NNTP, or FTP) and TCP/IP. Secure Sockets Layer (SSL), which is based on public key cryptography provides data encryption, server authentication, message integrity, and optional client authentication for a TCP/IP connection.

Standard Java enabled Web Servers provide for Secure Sockets Layer (SSL) to encrypt data flows between a Web server and a compatible Web browser. However, there are a number of problems with SSL, stemming from the fact that there can only be one level of encryption for all types of data:

data is decrypted, in the clear, within the server and browser;
  data transmitted between the browser and web server is either encrypted according to SSL or clear there is no intermediate protocol; and
  data is not compressed.

It can be seen therefore that SSL does not provide for closely specifying a quality of service and as such creates great difficulty for web application developers. Take, for example, a bank who wish to make financial services available through the Internet. The bank may have a back-end server on which client account information is stored. This server would normally be trusted and its information secure. The bank on the other hand may not necessarily trust its web server, and as such, SSL, which decrypts client information as it arrives at the web server, will not be satisfactory. Even if the security provided by SSL were satisfactory, then the bank may wish to define different ways of handling different information. The bank may wish to compress certain information sent from the server to a client applet, to improve bandwidth use where a lot of data is to be sent to an applet, whereas certain types of information may not be worth compressing, because downloading the software to decompress the data at the client would be too great an overhead. Again, SSL does not allow a developer to determine closely the quality of service required for such communication.

BACKGROUND OF THE INVENTION

The present invention seeks to mitigate the problems of SSL and other prior art by providing a session processing module for a server adapted to communicate across a packet switched network with a plurality of clients, said processing module comprising: means for allocating a session identifier in response to a first input stream of a session between a client and said server; means for negotiating communication characteristics for said session; and means for instantiating, according to said communication characteristics for said session, routines for processing subsequent session input streams containing request data and routines for generating session output streams containing response data.

The invention further provides a computer program product and a method for processing communication sessions between a server and a plurality of clients.

DESCRIPTION OF THE PREFERRED EMBODIMENT

Figure 1:
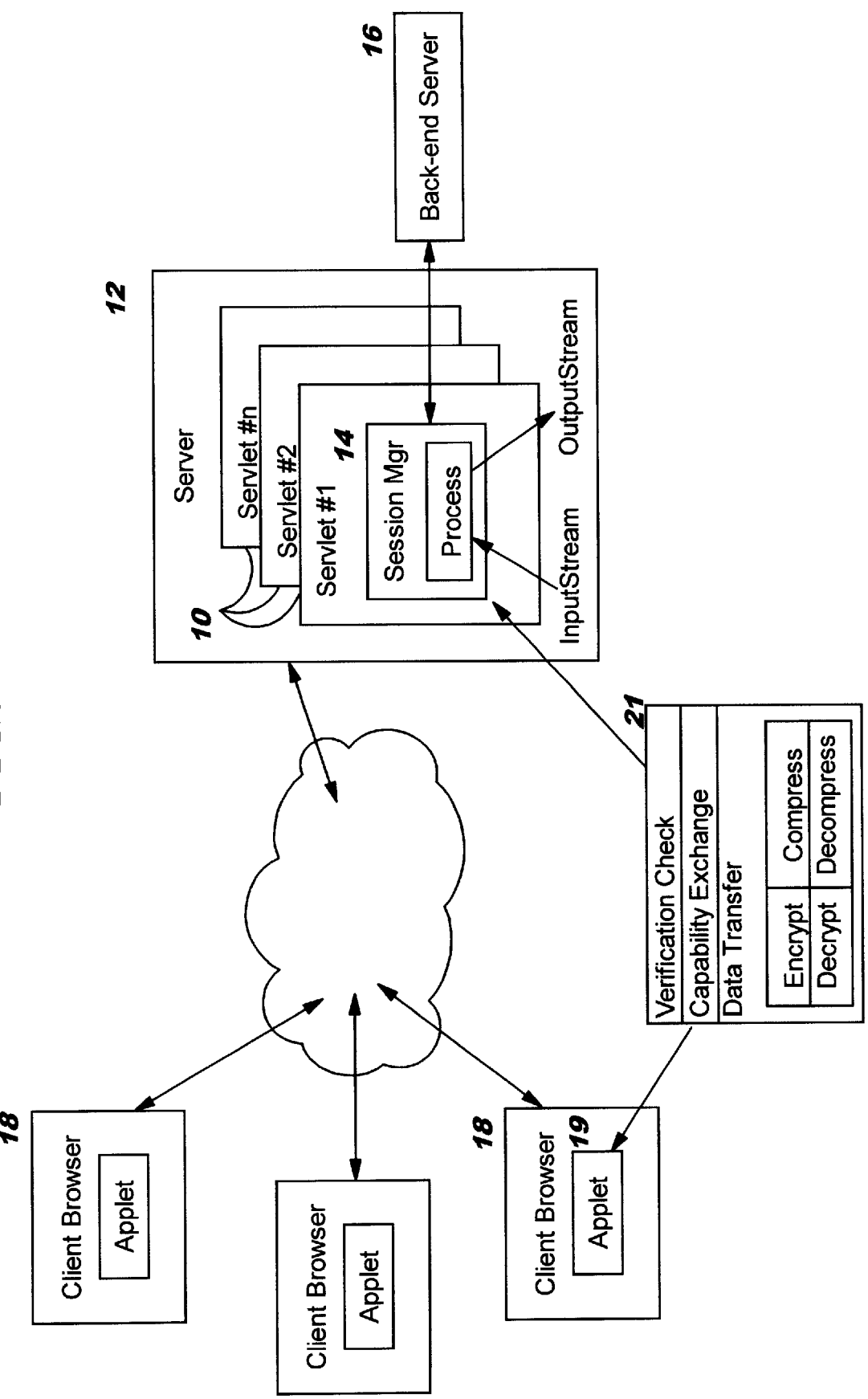
FIG. 1 is a schematic diagram including a plurality of web browsers communicating with a web server according to the present invention.

The present embodiment is implemented using Java Servlets 10 running on a web server 12, for example, a Lotus Domino Go Webserver, FIG. 1. Java Servlets were developed by Sun Microsystems not only to make applets available on the server side of web communications in Java enabled web servers but also as an open way of extending non-Java servers to be able to run Java applications. Examples of web servers, supporting servlets are Taligent WebRunner Toolkit, Lotus Domino Go Webserver and IBM Internet Connection Server.

Servlets running on a server are usually dedicated to carry out different tasks. One servlet may be simply returning share price information from a database to the server. Another may be connected to a back-end server to update client account information stored on the back-end server. In general, however, servlets are unaware which client 18, in terms of their TCP/IP address, is generating a request or which client is receiving the results they have generated—this is taken care of by the server.

It is well known that HTTP 1.0 is a stateless environment, that is, when a server has responded to a client request packet, it has no idea if subsequent requests come from the same client. In order to overcome this problem, many web servers enable a session to be established between the client 18 and the server 12. Typically, this involves allocating a session ID to a client when the client first connects to the server. The client then includes this session ID in all further request packets to the server allowing the server to remember the client. Alternatively, the client may include the session ID in the URL sent to the server.

In any case, a typical prior art stream of communication between a client and a server might be as follows:

a) The client connects to the server and transmits a request packet to the server;

b) The server receives the request packet from the client. If the packet does not contain a session ID, the server knows that this is the first communication of the session and generates a new session ID.

c) The server processes the information contained in the request packet. This might require a call to a servlet to carry out some task. The servlet returns its response and the response is packeted with the session ID and returned to the client.

d) In any subsequent communication, the client includes the session ID in its request packet.

e) In the present embodiment, however, session tracking is managed within one or more servlets 10 resident on a server 12. When one of these servlets is instantiated a method instantiates a session manager object 14 for the servlet. The session manager 14 is adapted to store the characteristics pertaining to the quality of service of each client/server session being managed by the session manager.

Figure 2:
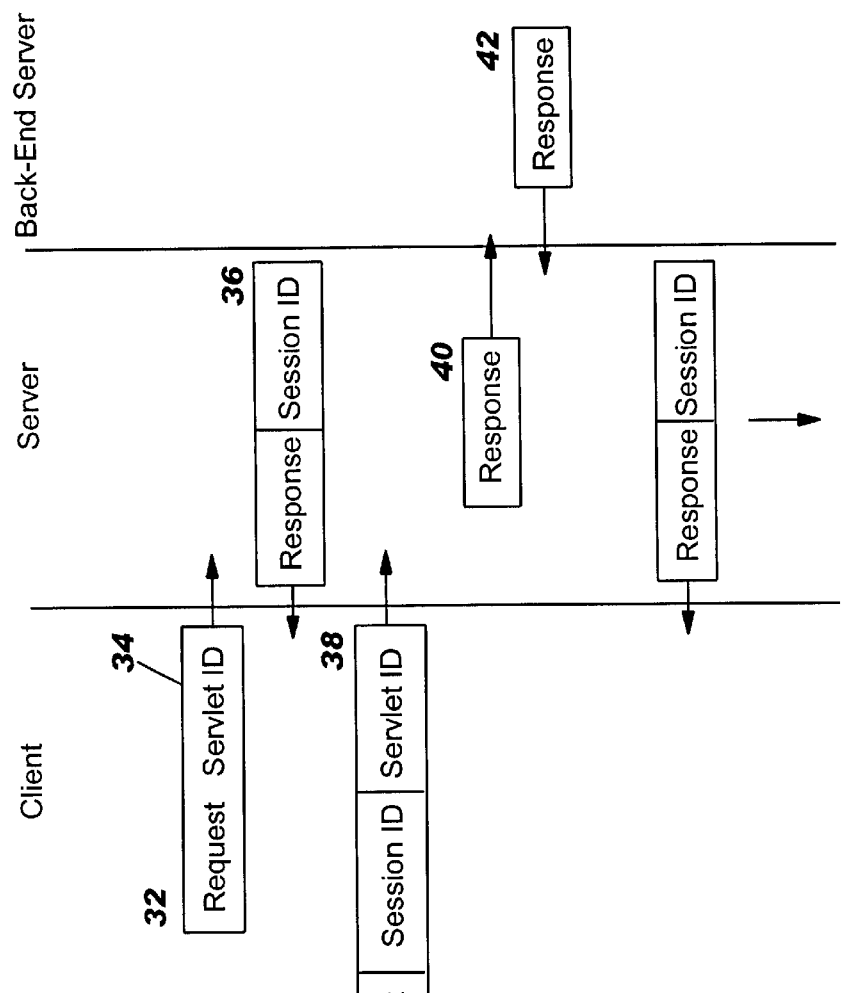
FIG. 2 is a flow diagram of a method used by a web server according to the invention.

Each servlet 10 exposes a number of methods to the server 12, one of which is doPost. doPost receives two standard servlet objects HttpServletRequest and HttpServletResponse which enable a servlet to read request data sent by a client and to write response data to a location where the server can pick up the data and relay it to the client, as shown in FIG. 2.

The HttpServletRequest object exposes a method getContentLength which returns the length in bytes of the request information, step 20. doPost then sets up a byte array httpInData of a suitable size to store the request information as well as another byte array httpOutData to store response information, step 22. The HttpServletRequest and HttpServletResponse objects also expose respective methods getInputStream and getOutputStream which return objects which enable the input data to be read and output data to be written, step 24. The byte array httpInData is then populated from the InputStream, step 26, before passing httpInData to the session manager, step 28. Each session manager object exposes a method "Process" which takes the httpInData, processes this input data and returns the result which is stored in httpOutData. httpOutData is then written to an OutputStream by the servlet, step 30, where it is picked up and returned to the client by the server.

Figure 3:
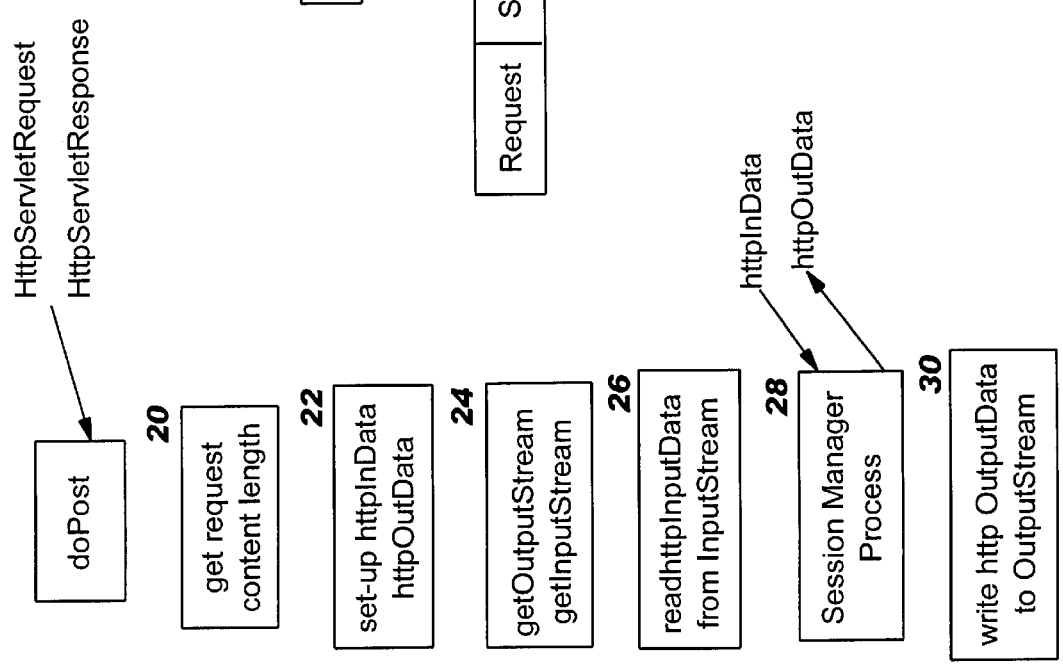
FIG. 3 is a schematic diagram illustrating data packets generated by a client and web server according to the invention.

Referring now to FIG. 3, in the present embodiment a typical stream of communication between a client and a server running servlets might be as follows:

a) A client applet 19 opens a socket within its Java environment to connect to the server and transmits a request packet 32 to the server. The request packet contains an identifier 34 of the servlet to which the packet is to be directed.

b) The server receives the request packet 32 from the client and forwards the packet to the appropriate servlet by calling the servlet doPost method.

c) Within doPost, the input and output streams are set up as described for FIG. 2, and the servlet then passes control to a session manager component by calling the session manager Process method.

d) Process, which can be different for each session manager, examines the packet. If the packet does not contain a session ID, the session manger knows that this is the first communication of the session and instantiates a new session having a new session ID.

e) In a preferred embodiment, the session manager now begins a negotiation with the client based on conventional public key cryptography, or more specifically Diffie Hellman key exchange, comprising a series of requests and responses to verify the clients identity. If the verification fails, then the client applet 19 is prevented from establishing a session and therefore accessing compression/encryption classes 21 resident on the server.

f) During the negotiation, the client requests specific security, encryption and compression characteristics required for the session—this information may have been contained in the first request packet 32. For example, a session could be instantiated from within the client applet 19 as follows:

Session=new HttpSession("DesCryptor", "RleCompressor", URL);

This initiates the session connecting to the URL specified and which is to be encrypted with DES and compressed with Run Length Encoding.

If a session is established, Process receives the request packet containing the above strings specifying the cryptor and compressor and instantiates a SessionCompressor and a SessionCryptor object by calling a LoadObject method as follows, where the variables CompressorName and CryptorName are assigned the string values for the compressor and cryptor respectively:

SessionCompressor=(Compressor)

Loader.LoadObject(CompressorName);

SessionCryptor=(Cryptor

Loader.LoadObject(CryptorName);

The terms cryptor and compressor in brackets ensure that the objects loaded are of the correct class, thus exposing required methods for processing input and output streams. It will also be seen that the client applet also instantiate corresponding routines within the applet 19. Other compressor/cryptor routines could, for example, be standard Java Zip routines for compressing and decompressing data or routines for carrying out RSA type encryption/decryption of data.

g) The client application can now start communicating with the server servlet. In any subsequent communication, the client includes the session ID in its request packet. If the request is for an existing session, the session manager finds the existing session information and passes the encoded/compressed data to the decryption/decompression routines.

In relation to the quality of service, in the case of servlet #1, Process relays request packets 40 to a back-end server 16 and receives responses 42 from the server 16, before packeting the responses with the session ID and returning them to the server 12 for delivery to the client. These requests and responses can remain encrypted through the servlet, so that the server 12 only acts as a tunnel through which information is relayed to and from client 18 and back-end server 16. This means that the encryption blanket, which under SSL could only reach as far as the server 12, can now reach as far as the trusted back-end server 16.

Other servlets or sessions within the same servlet, may not require compression or decryption and information can be exchanged between client and server in the clear. Alternatively, the servlet itself can decompress or decrypt information creating an intermediate depth of compression/encryption which stops inside the server 12, and which even rogue applications running on the server 12 cannot violate.

It will be seen nonetheless, that the invention can still be used under an SSL channel allowing up to a double layer of encryption for particularly secure applications.

Thus, the invention provides a system and method enabling a quality of service and its depth of operation within a client/server environment to be specified.

It will be seen that the invention is not limited to a system where a client has only one session within a server. Should a client be running more than one applet 19, then each of these can have independent sessions, each with a different quality of service, with respective servlets. It will be seen that it is possible for the same client to have two applets, with sessions having a different quality of service, with the same servlet. In this case, the first session would be established as described above, while the second would be initiated by the client sending a request packet in the format of request packet 32, causing the servlet to issue a new session identifier. The session manager would then negotiate a second quality of service and carry on communication in the second session independently of the first.

What is claimed is:

1. A session processing module for a server adapted to communicate across a packet switched network with a plurality of clients, wherein the server includes means for running simultaneous communication sessions with a plurality of the clients via a single network connection to the server, said processing module comprising:

means for allocating a session identifier in response to a first input stream of a session between a client and said server;

means for negotiating communication characteristics specifically for said client-server session; and means for instantiating, according to said negotiated communication characteristics for said session, routines for processing subsequent session input streams containing request data and routines for generating session output streams containing response data.

2. A session processing module as claimed in claim 1 wherein said negotiation means includes means for authenticating the identity of client to said server and the identity of said server to said client.

3. A session processing module as claimed in claim 1 wherein said negotiation means includes means for determining routines by which said request data and said response data for a session are compressed and decompressed by said client or said server.

4. A session processing module as claimed in claim 1 wherein said negotiation means includes means for determining routines by which said request data and said response data for a session are encrypted and decrypted by said client or said server.

5. A session processing module as claimed in claim 4 including processing means adapted to relay request data for a session, encrypted by a client as determined by said negotiation means, to a back-end server, and to receive response data for said session, encrypted by said back-end server as determined by said negotiation means, for said client.

6. A session processing module as claimed in claim 4 including processing means adapted to decrypt input streams containing request data, encrypted by a client as determined by said negotiation means, and to process said data to generate output streams containing response data, encrypted as determined by said negotiation means, for said client.

7. A session processing module as claimed in claim 4 wherein said negotiation means is adapted to determine that no encryption is necessary.

8. A servlet comprising initialisation means for instantiating a session processing module according to claim 3, said servlet including one or more compression/decompression means adapted to be selectively instantiated, according to the communications characteristics for a session, by said processing module to compress response data and to decompress request data or by said client to compress request data and to decompress response data.

9. A servlet comprising initialisation means for instantiating a session processing module according to claim 4, said servlet including one or more encryption/decryption means adapted to be selectively instantiated, according to the communications characteristics for a session, by said client to encrypt request data and to decrypt response data or by said processing module to encrypt response data and to decrypt request data.

10. A server including one or more servlets according to claim 8, said server including means for receiving said input streams including a servlet identifier from a client, means for relaying said input streams to a servlet identified by said servlet identifier and means for relaying output streams from the servlet to said client.

11. A computer program product stored on a computer readable storage medium for, when executed on a computer, session processing in a virtual machine for managing a plurality of simultaneous communication sessions via a single network connection to the server, the virtual machine being for operating with a computer processing system, the product comprising:

means for allocating a session identifier in response to a first input stream of a session between a client and said server;

means for negotiating communication characteristics specifically for said client-server session; and means for instantiating, according to said negotiated communication characteristics for said session, routines for processing subsequent session input streams containing request data and routines for generating session output streams containing response data.

12. A method for processing communication sessions between a server and a plurality of clients in a data communications system, wherein the server has means for running simultaneous communication sessions with a plurality of said clients via a single network connection to the server, comprising the steps of:

allocating a session identifier in response to a first input stream of a session between a client and said server;

negotiating communication characteristics specifically for said client-server session; and instantiating, according to said negotiated communication characteristics for said session, routines for processing subsequent session input streams containing request data and routines for generating session output streams containing response data.

* * * * *